United States Patent
Joukov (10) Patent No.: US 8,271,639 B2
(45) Date of Patent: Sep. 18, 2012

(54) DISCOVERING PHYSICAL SERVER LOCATION BY CORRELATING EXTERNAL AND INTERNAL SERVER INFORMATION

(75) Inventor: Nikolai A. Joukov, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 12/698,526

(22) Filed: Feb. 2, 2010

(65) Prior Publication Data

US 2011/0191454 A1    Aug. 4, 2011

(51) Int. Cl.
G06F 15/173    (2006.01)

(52) U.S. Cl. ........................................ 709/223; 709/224

(58) Field of Classification Search .......... 709/223–226, 709/200; 340/539.27, 572.1, 572.2, 572.4, 340/622, 640
See application file for complete search history.

(56) References Cited

U.S. PATENT DOCUMENTS

| | | | | |
|---|---|---|---|---|
| 5,771,003 A * | 6/1998 | Seymour | .................... | 340/572.1 |
| 5,991,759 A * | 11/1999 | Knoblock et al. | .................... | 1/1 |
| 6,796,506 B1 * | 9/2004 | Pradhan et al. | .......... | 235/462.13 |
| 7,072,739 B2 * | 7/2006 | Bash et al. | .................... | 700/245 |
| 7,350,715 B2 * | 4/2008 | Pradhan et al. | ................ | 235/492 |
| 7,411,502 B2 * | 8/2008 | Collins et al. | .............. | 340/572.1 |
| 7,499,865 B2 * | 3/2009 | Aggarwal et al. | ............ | 705/7.11 |
| 7,528,720 B2 * | 5/2009 | Collins et al. | .............. | 340/572.1 |
| 7,642,914 B2 * | 1/2010 | Campbell et al. | .......... | 340/572.1 |
| 7,686,229 B2 * | 3/2010 | Lyon et al. | .................... | 235/492 |
| 7,746,229 B2 * | 6/2010 | Grater et al. | ................ | 340/572.1 |
| 2003/0191962 A1 * | 10/2003 | Calvert | ......................... | 713/201 |
| 2005/0160323 A1 * | 7/2005 | Wu et al. | ........................ | 714/39 |
| 2007/0110306 A1 * | 5/2007 | Ling et al. | .................... | 382/168 |

OTHER PUBLICATIONS

Levina, E., et al., "The Earth Mover's distance is the Mallows distance: some insights from statistics", Computer Vision, 2001. ICCV 2001, Proceedings. Eighth IEEE International Conference on In Computer Vision, pp. 251-256, vol. 2.
IBM, "Mobile Measurement Technology (MMT)", IBM Global Technology Services.

* cited by examiner

Primary Examiner — Ario Etienne
Assistant Examiner — Sargon Nano
(74) Attorney, Agent, or Firm — Scully, Scott, Murphy & Presser, P.C.; Louis J. Percello, Esq.

(57) ABSTRACT

The present invention includes a computing system for discovering a physical location of a physical server device in a datacenter. The computing system obtains at least one physical property of the physical server device pertaining to the physical location of the physical server device. The computing system acquires at least one logical property of the physical server device pertaining to a logical server name of the physical server device. The computing system correlates the at least one physical property and the at least one logical property. Thereby, the computing system matches the logical server name to the physical location.

23 Claims, 5 Drawing Sheets

DISCOVERING PHYSICAL SERVER LOCATION BY CORRELATING EXTERNAL AND INTERNAL SERVER INFORMATION

BACKGROUND

The present invention generally relates to discovering a physical location of a physical server device. More particularly, the present invention is related to matching a logical property of the physical server device to a physical property of the physical server device.

Datacenters is a facility equipped with computing devices (e.g., HP® MediaSmart Server) and electronic components (e.g., telecommunication and/or storage devices). Datacenters have thousands of server devices. These servers are almost always managed remotely without a physical access for a lot of years (e.g., more than 10 years). As a result, there is usually no known mapping between logical server device names and functions and their physical locations. However, many practical IT optimization tasks such as network topology revisions, power wiring changes, rack server upgrades, cooling optimization, rack relocation, server virtualization and resulting server decommissioning require precise knowledge of the physical server locations, i.e., the physical locations of the server devices. Furthermore, rack server upgrades and decommissioning is usually justified if they are performed for a set of physically co-located servers. A rack server is a computing system including a plurality of server devices. Knowledge of the physical server locations is also necessary during a planning stage of IT optimization tasks.

In traditional datacenter environments, system administrators or teams performing the discovery of physical server locations have to connect every server device to a console (i.e., a physical device for system administrators to enter and display texts) manually to log-in and associate the server device with its logical name and address. Currently, a discovery of physical server locations is performed completely manually. A physical server location refers to a specific position (e.g., an internal (X, Y, Z) coordinate in a datacenter) of the physical server in the datacenter.

Therefore, it is highly desirable for a computing system to automatically perform the discovery of the physical server locations, e.g., in a datacenter, to assist the system administrators and to save cost associated with the discovery.

SUMMARY

The present invention describes a system, method and computer program product that automatically performs the discovery and location of the physical server devices.

In one embodiment, there is provided a computer-implemented method for discovering a physical location of a physical server device in a datacenter, the method comprising:

obtaining at least one physical property of the physical server device pertaining to the physical location of the physical server device;

acquiring at least one logical property of the physical server device pertaining to a logical server name of the physical server device; and correlating the at least one physical property and the at least one logical property to match the logical server name to the physical location.

In one embodiment, there is provided a computer-implemented system for discovering a physical location of a physical server device in a datacenter, the system comprising:

a memory device; and a processor unit in communication with the memory device, the processor unit performs steps of:

obtaining at least one physical property of the physical server device pertaining to the physical location of the physical server device;

acquiring at least one logical property of the physical server device pertaining to a logical server name of the physical server device; and correlating the at least one physical property and the at least one logical property to match the logical server name to the physical location.

In a further embodiment, the at least one physical property further includes one or more of: the physical server device's exterior details, a visual signal from the physical server device, an audio signal from the physical server device, an electromagnetic signal from the physical server device, heat from the physical server device, physical positions of components in the physical server device.

In a further embodiment, the at least one logical property further includes one or more of: a MAC (Media Control Access) address of the physical server device, a unique serial number of the physical server device, a state of a LED attached on a component in the physical server device, a CPU utilization, hard disk states and a network card state of the physical server device.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
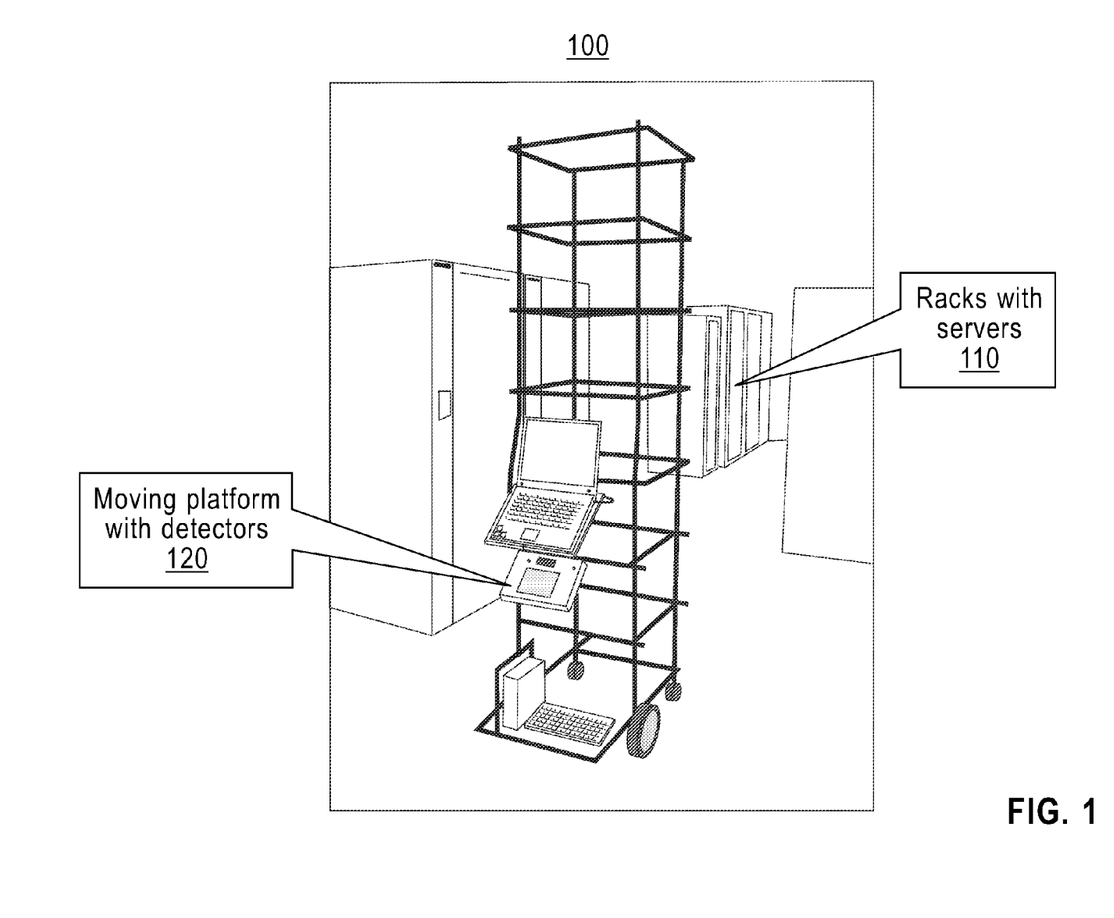
FIG. 1 illustrates a datacenter environment according to one embodiment of the present invention.

FIG. 1 illustrates an exemplary datacenter environment according to one embodiment of the present invention. A datacenter 100 includes a plurality of servers 110. A server (e.g., IBM® System x3650, HP® ProLiant DL Rack Mount Servers) includes a plurality of physical server devices. A physical server device (e.g., IBM® System x3850 M2, HP® Alpha systems) is a computing device including, without limitation, at least one processor, at least one memory device, etc. The computing device may run at least one server application, e.g., Apache HTTP server. In this embodiment, the datacenter includes at least one detector 120 attached on a moving platform or a stationary platform or carried manually. The detector includes, but is not limited to: a bar code scanner, a photo or video camera, CCTV (Closed-Circuit Television), and a microphone. The moving platform includes, but is not limited to: a mobile robotic device. An exemplary moving platform is further described in Bash et al., "Data Center Robotic Device", U.S. Pat. No. 7,072,739 B2, wholly incorporated by reference as if set forth herein and/or also described in "Mobile Measurement Technology (MMT), IBM® Global Technology Services, 2008, wholly incorporated by reference as if set forth herein. The stationary platform, while not mobile, may include, for example, a cabinet or rack.

Figure 2:
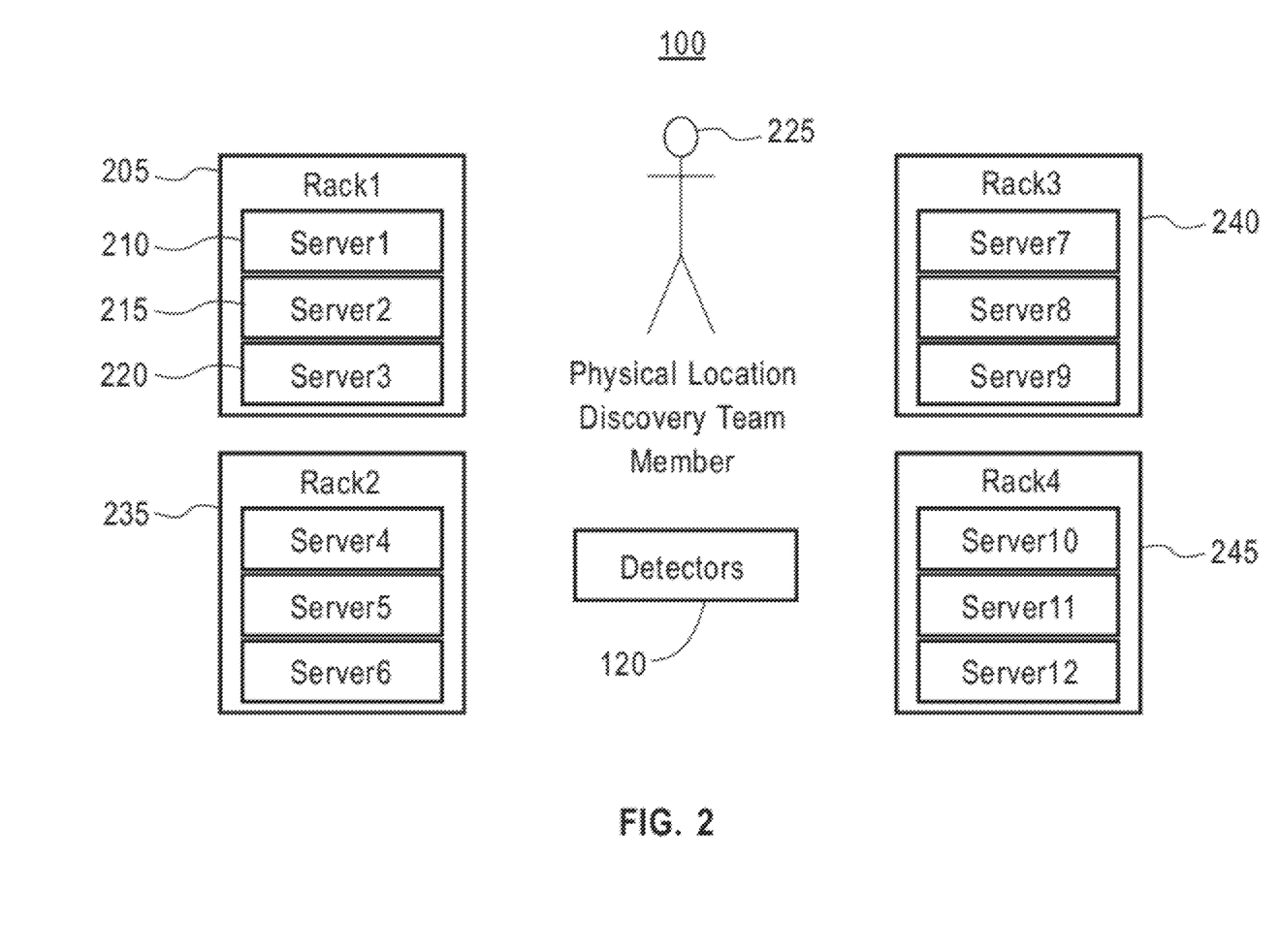
FIG. 2 illustrates server devices in the datacenter according to one embodiment of the present invention.

FIG. 2 illustrates server devices in the datacenter according to one embodiment of the present invention. In the datacenter 100, there exists a plurality of racks with servers, e.g., a rack 1 (205), a rack 2 (235), a rack 3 (240), a rack 4 (245). A rack includes a plurality of physical server devices. For example, the rack 1 (205) includes a plurality of server devices, e.g., a physical server device 1 (210), a physical server device 2 (215), a physical server device 3 (220), etc. The datacenter 100 includes the detectors 120. There may exist a team of specialists 225 responsible for discovering a physical location of a physical server device in the datacenter. The team 225 discovers the physical location of a physical server device, e.g., by running method steps depicted in FIG. 4 in a computing system (e.g., a computing system 500 in FIG. 5).

Figure 4:
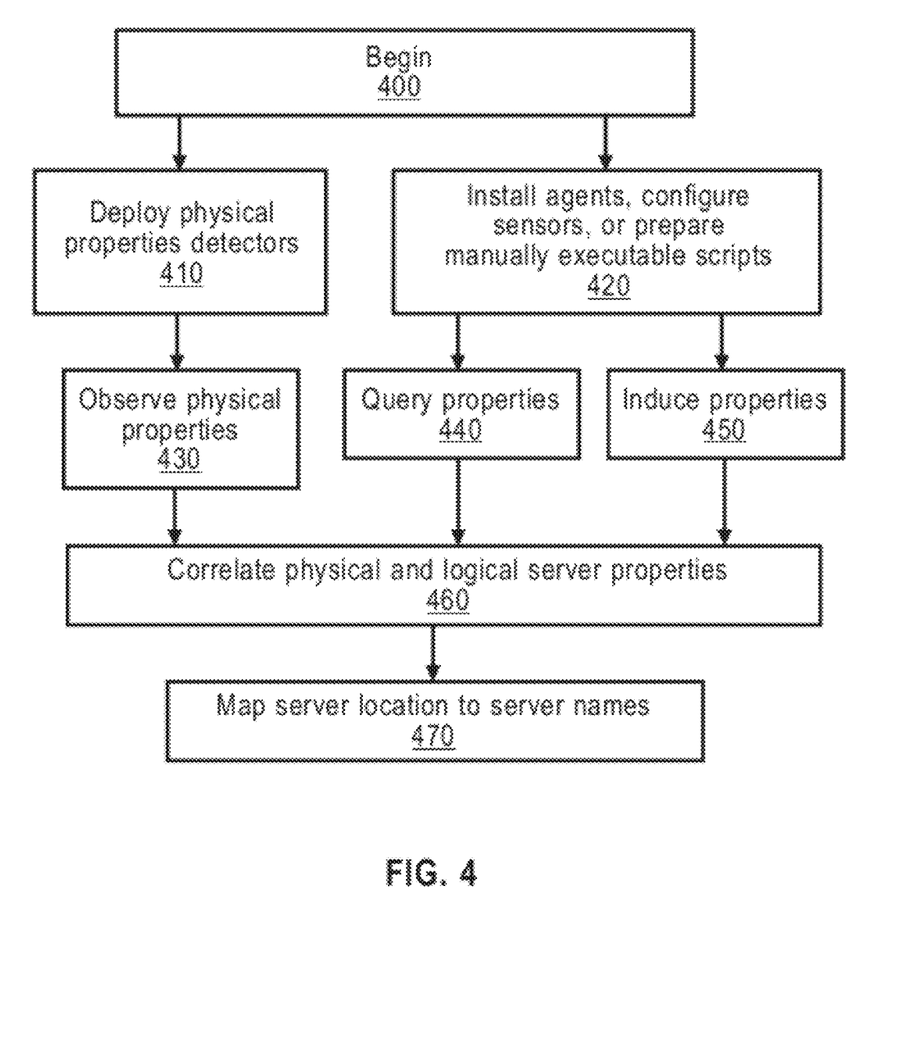
FIG. 4 illustrates a flow chart including method steps for discovering a physical location of a physical server device according to one embodiment of the present invention.

FIG. 4 illustrates a flow chart including method steps for discovering a physical location of a physical server device according to one embodiment of the present invention. At step 400, the computing system starts a process for discovering the physical location of the physical server device. At steps 410 and 430, the computing system obtains at least one physical property (i.e., externally observable property) of the physical server device, e.g., by using at least one detector. The at least one physical property includes, but is not limited to: the physical server device's exterior details or attributes or characteristics (e.g., scratches on the physical server device), a visual signal from the physical server device, an audio signal from the physical server device, an electromagnetic signal from the physical server device, heat from the physical server device, and physical positions of components in the physical server device in relation to a fixed internal reference location(s), e.g., a front end of an aisle 1. The at least one physical property uniquely identifies the physical location of the physical server device. For example, a source of the signal(s), i.e., where the signal(s) comes from, indicates the physical location of the physical server device. A unique scratch on a physical server device distinguishes that physical server device over other physical server devices. Upon identifying the unique scratch, a detector equipped with a positioning system may send an image including the scratch and its global position (i.e., its specific latitude and longitude) to the computing system, e.g., by using an electronic text message, email, electronic alert, etc. Thus, the computing system finds a location of the physical server device having the unique scratch. Server devices can emit signals at the same time but the signals may be different. For example, LED blinking times may correspond to a workload of each specific server. Host name or MAC address encoded in the signal may be different for each server. Alternatively server devices can emit the same signal but at different times (e.g., ejecting a CDROM at particular time unique for each server).

Examples of the visual signal include, but are not limited to: a first activated indicator device (e.g., a first blinking LED (Light Emitting Diode)) attached on a storage device of the physical server device, a second activated indicator device (e.g., a second blinking LED) attached on a network card of the physical server device. The heat signal includes, but is not limited to: heat generated from a device running or operating (e.g., CPU) in the physical server device. The audio signal includes, but is not limited to: noise generated from a cooling fan in the physical server device.

In a further embodiment, the computing system determines a location of the at least one detector by one or more of: a fixed internal coordinate of the datacenter (e.g., a detector located between an aisle 1 and an aisle 2), a positioning device using sound, optical or radio wave (e.g., a gyroscope, GPS (Global Positioning System), assisted GPS), etc. The at least one detector on the moving platform may recognize locations at which the detector identifies the at least physical property, e.g., based on the global positioning system. The at least one detector on the stationary platform may recognize the locations at which the detector identifies the at least physical property, e.g., based on a relative distance or coordinate between the detector and a physical server device having the at least one physical property. The detector may measure the relative distance or coordinate of a physical server device having the at least one physical server device, e.g., by sending a traceable signal (e.g., signals used in Sonar (Sound Navigation and Ranging) system) to where the at least physical property is identified.

Returning to FIG. 4, at steps 420 and 440, the computing system also obtains at least one logical property (i.e., internal server properties or attributes) of the physical server device, e.g., by querying to the physical server device, accessing and/or parsing a log file associated with the physical server device, installing a software program on the physical server device for finding the at least one logical property, configuring or installing sensors on the physical server device for detecting the at least one logical property, and/or preparing and running scripts in the physical server device for identifying the at least one logical property. The at least one logical property includes one or more of: a MAC (Media Control Access) address of the physical server device, a unique serial number of the physical server device, a state of an LED attached on a component in the physical server device, a CPU utilization, a network card state, hard disk state and a logical server name. The at least one logical property uniquely identifies a logical server name (e.g., a domain name hosted by the physical server device) of the physical server device. For example, the computing system can find an one-to-one match between the MAC address and a logical server name, e.g., by using a well-known known reverse address resolution protocol (i.e., a protocol obtaining an IP address from a MAC address) and well-known reverse DNS lookup operation (i.e., an operation for determining a domain name associated with an IP address). In this example, each physical server device maintains a database (e.g., tables) of mapping of IP addresses to MAC addresses.

In a further embodiment, at step 450, the computing system obtains the at least one logical property by generating a signal to induce the at least one logical property. The generating a signal for inducing the at least one logical property does not require obtaining credentials on the physical server device. In other words, in this embodiment, the computing system may or may not need to run any code, command or program on the physical server device. For example, the computing system sends a network packet to the physical server device. The sent network packet causes or induces the physical server device's network card LED blink. However, in this example, to send the network packet to the physical server device, the computing system need not run any code, command or program in the physical server device to obtain the at least one logical property because the sending the network packet only intends to cause the network card LED blink and does not engage a CPU in the physical device to perform any work.

After obtaining the at least one physical property and the at least one logical property, at step 460, the computing system correlates the at least one physical property and the at least one logical property, e.g., by using Earth Mover's Distance (EMD) algorithm. The EMD algorithm calculates a similarity between two data sets. For example, let $E\_x(t)$ be the number of network card LED blinks per second during a period "t" on a physical server device "x". Let $L\_s(t)$ be the number of incoming requests per second during the period "t" for a physical server device "s" as obtained from a log file. In this example, the EMD algorithm calculates a similarity metric (a number) for each pair of "x" and "s" for functions of $E\_x$ and $L\_s$. The EMD algorithm matches a particular "x" to a particular "s" when a pair of the particular "x" and the particular "s" has the highest similarity score among all similarity scores for all x and s pair-wise combinations. At step 470, according to the correlation, the computing system maps or matches the at least one physical property identifying the physical location to the at least one logical property identifying the logical server name. Elizaveta Levina, et al., "The Earth Mover's Distance is the Mallows Distance: Some Insights from Statistics", Proceeding of ICCV, 2001, pages 251-261, wholly incorporated by reference as if set forth herein, describes in detail the EMD algorithm.

Figure 3:
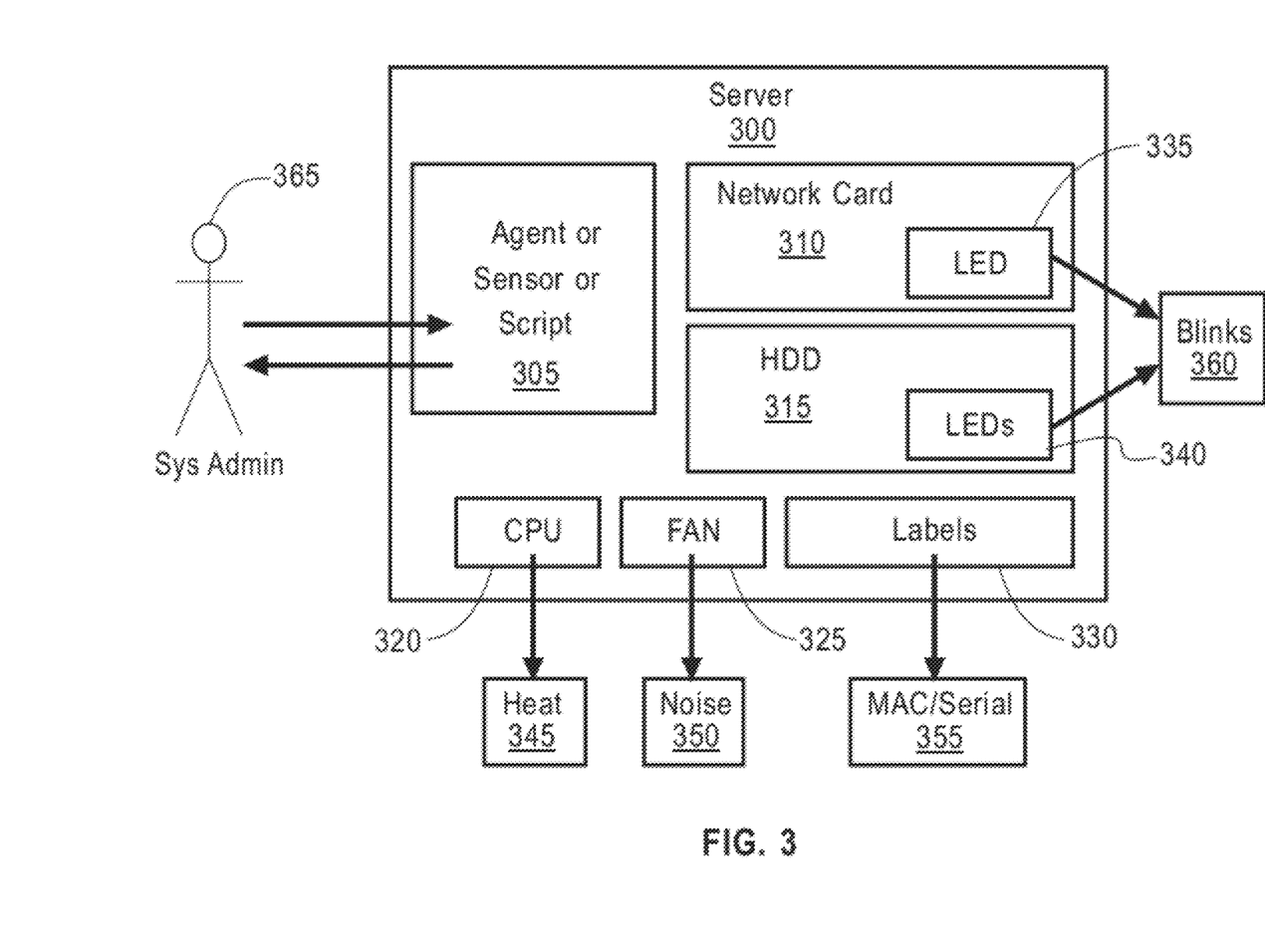
FIG. 3 illustrates components in a server device according to one embodiment of the present invention.

FIG. 3 illustrates components and/or properties in a physical server device 300 according to one embodiment of the present invention. The physical server device 300 includes at least one physical property including, without limitation: server workload-induced properties (i.e., when the physical server device 300 processes information, the physical server device 300 emits signals characterizing their workloads). For example, a storage device (e.g., Hard Disc Drive 315) LED 340 is blinking 360 when the storage device is being accessed by a processor 320. A network card 310 LED 335 is blinking 360 when the network card is used to transmit or receive data. The processor 320 consumes more power and generates more heat 345 when the processor 320 is highly utilized (e.g., CPU utilization rate is more than 80%). As a result, a cooling fan 325 may rotate faster generating more noise 350, the processor 320 generates more electromagnetic noise potentially at a higher frequency (e.g., a clock frequency higher than 2 HGz), and the server devices consumes more power. The physical server device 300 includes at least one physical property including, without limitation: static physical properties such as labels 330 indicating a network interface MAC address or serial number 335. The at least one physical property is usually printed on a reverse side of the physical server device 300 as numbers and/or bar codes 330. A system administrator 365 may be able to obtain the corresponding logical properties such as MAC address or serial number 355, e.g., by querying to the physical server device 300 after running a script or a software program 305 on the physical server device 300 written by a well-known programming language such as Perl, JavaScript, C/C++, .Net, etc.

Detection of the at Least One Physical Property

There are provided the at least one detector 120 in the datacenter 100 that monitors and logs video and/or audio signals (e.g., blinking 360, noise 350), captures radio-frequency signals, measures air temperature, records time and location, and scans bar-codes 330. Thus, the at least one detector 120 may include, but is not limited to: bar-code scanner and image, audio and/or video processing device (e.g., an analog or digital video camera), high resolution timer, position detector, radio-frequency detector, and thermometers. In one embodiment, the at least one detector 120 can be attached on a stationary platform or on a moving platform. The moving platform moves along aisles in the datacenter 100 measuring and recording the signals and/or bar-codes from/on the physical server devices along the aisles. Alternatively, the users can carry the at least one detector 120 (e.g., a hand-held video camera). In a further alternative embodiment, a user (e.g., a system administrator 365) monitors and records simple signals (e.g., beeps or blinks 360 with LEDs) manually without an assistance from the at least one detector 120.

Figure 5:
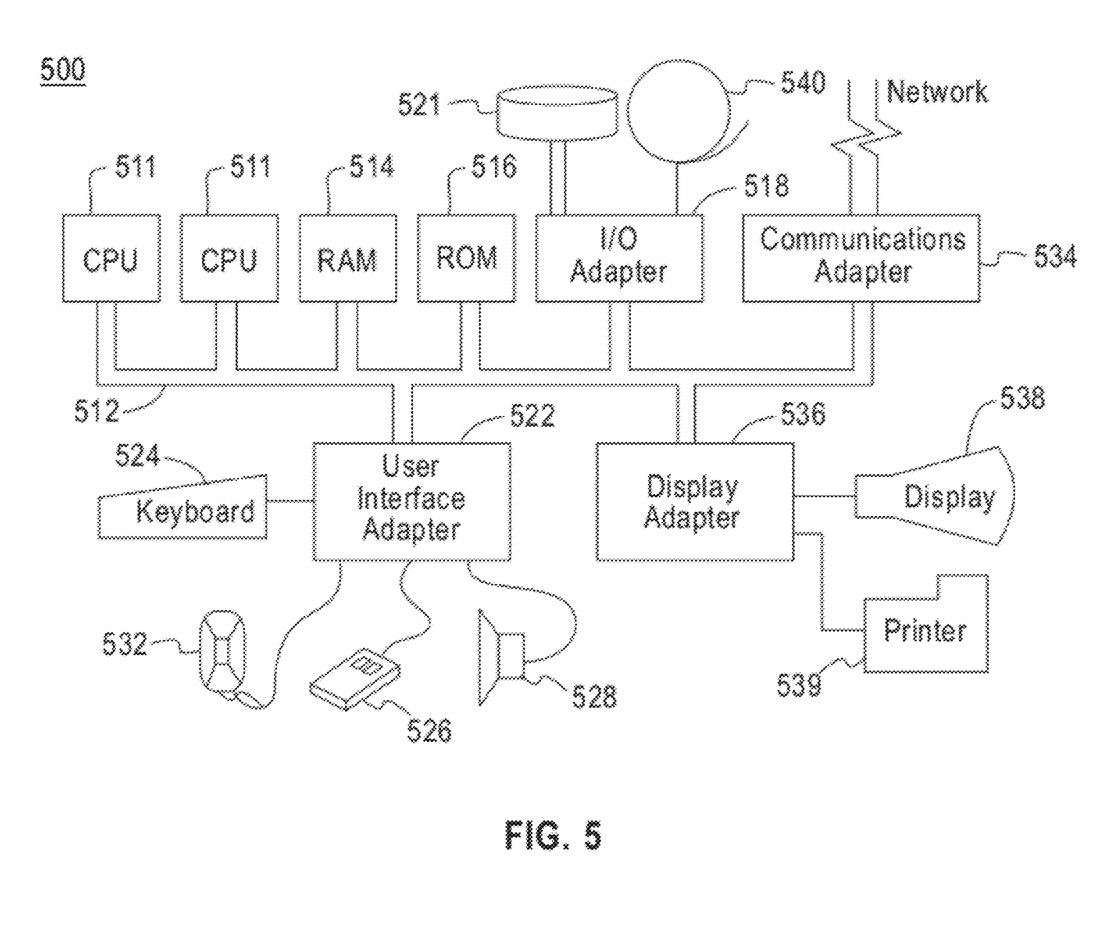
FIG. 5 illustrates an exemplary hardware configuration for implementing the flow chart depicted in FIG. 4 according to one embodiment of the present invention.

The computing system 500 determines a location of the at least one detector 120 manually or automatically. For example, a user may point out the location of the at least one detector 120 at a specific area in the datacenter 100. Alternatively, the computing system 500 coordinates a direction and/or location of the at least one detector 120, e.g., by using internal reference coordinates in the datacenter 100 such as a distance to walls, an aisle number and a height from a floor and/or by using any of existing positioning devices including, without limitation: a gyroscope, global positioning systems (GPS) or assisted GPS, any other positioning device based on sound, optical, or radio wave.

Detection and Generation of the at Least One Logical Property

The computing system obtains the at least one logical server property of the physical server device 300 including, but not limited to: MAC address and/or serial number 355, a state of a LED (i.e., whether a LED is blinking or not), a CPU utilization, hard disk state, and a network card state (i.e., whether the network card 310 is used or not), e.g., by a query and/or inducement using a command or a software program run on the physical server device 300.

Properties Query

In one exemplary embodiment, a Linux™ command "/sbin/ifconfig" may be used to return the MAC address 355 on a Linux server (i.e., a server device running Linux operating system). A Linux™ command "netstat -i" returns the number of network packets sent and received by each network interface. Thus, a user can periodically call this "netstat -i" command and record a timeline of each network interface usage. Information characterizing a server device usage during a period can be obtained from various activity logs. For example, an incoming request log in a web server device log reflects a network card activity and thus its LED states. An application server usage log reflects CPU utilization and thus its heat generation.

Properties Inducement

An "eject" command on a Linux server forces a CDROM drive to eject a CDROM tray and thus changes a physical property of this server by making its CDROM tray ejected. Other ways to induce server properties include, but are not limited to: generating sound and/or visual signals for identifying the physical server device 300. Such signals can be emitted by the speakers or LEDs on the physical server device 300. These signals can also encode the MAC address 355 or other identifications of the physical server device 300. In one embodiment, the computing system uses Amplitude Modulation (AM), Frequency Modulation (FM) and/or PM (Phase Modulation) to encode information (e.g., MAC address 355) to the signals.

In one embodiment, to observe or induce the at least one logical property, the computing system runs a command or read a file on the physical server device 300. Alternatively, the computing system observes or induces the at least one logical property without running a command or read a file on the physical server device 300, e.g., by sending a network packet to the physical server device. Therefore, the computing system needs to either have (1) software program installed and running on the physical server device 300; (2) software sensors or monitors (the sensors/monitors are transferred to the physical server device 300 on-demand from a centralized control server (not shown), run the sensors/monitors on the physical server device 300, and remove the sensors/monitors from the physical server device 300); and (3) scripts that a system administrator or a user transfers to the physical server device 300 and runs on the physical server device. The benefit of the third approach (i.e., "(3) scripts") is that the team 225 does not need to obtain credentials (e.g., a password, a username, etc.) of the physical server device 300. The software sensor/monitor includes, but is not limited to: the MRTG—a tool that can collect network, CPU, memory usage logs. Additionally, the computing system can generate network traffic targeting the physical server device 300 and correlates a network card activity (e.g., the network card 310 LED 335 blinking 360 as shown in FIG. 3) with incoming network traffic patterns. This approach (i.e., sending network traffic to a particular physical server device) does not require running of any command or software program on the particular physical server device.

Correlation of Physical and Logical Properties

The computing system maps the at least one physical property to the at least one logical property. Thereby, the computing system maps a physical location of the physical server device 300 to a logical name of the physical server device 300. The computing system identifies the physical location, e.g., by detecting at the detector 120 where the signals come from. The computing system identifies the logical server name (e.g., a domain name hosted by the physical server device 300), e.g., by scanning the MAC address 355 and by a well-known reverse address resolution protocol that maps an MAC address to a host address. Optionally, if the physical server device 300 has a different logical server name other than the domain name, a well-known reverse DNS look up operation maps the host name to the logical server name.

In one embodiment, a mapping of the at least one physical property (e.g., information describing heat generated from the physical server device 300) to the at least one logical property (e.g., a log file describing activity of the physical server device 300 during a period) requires using an algorithm (e.g., the EMD algorithm) to match two data sets (e.g., a log representing the at least one physical property and a log representing the at least one logical property). Alternatively, the computing system uses other existing matching algorithms (e.g., matchIT Data Quality Suite from helpIT Systems Ltd.) to map these two data sets.

In a further embodiment, the computing system matches more than two logs (e.g., network card 310 LED 335 blinks 360, hard disk drive 315 LED 340 blinks 360, heat 345 generated from CPU 320, MAC address 355, etc.) representing the at least one physical property and the at least one logical property. In this embodiment, when running the EMD algorithm, the computing system assigns each weight to each similarity score and assumes that a particular logical property is matched to a particular physical property when this pair of the particular logical property and physical property generates the highest total similarity score. For example, a total similarity score is obtained by multiplying each similarity score and each weight and then adding results of the multiplications, i.e., total_similarity_score=$\Sigma_i$ similarity_score$_i$*weight$_i$.

Once the computing system matches the physical server location to its logical properties, a discovery of relationships between the server IDs and logical server names becomes straightforward. For example, the computing system performs this discovery, e.g., by looking up server registry databases or by a network or server-side discovery (e.g., the step 420 in FIG. 4—using software agents, configuring sensors, or running scripts manually prepared).

Reuse of Physical Server Discovery Information

It is common that physical server devices are reused and their system administrators can be changed. A new system administrator may be unknown to the team 225 (i.e., the team responsible for discovering a physical location of a physical server device in the datacenter). Thus, the team 225 may be no longer possible to login to this physical server device to query the at least one logical property of this physical server device. However, in one embodiment, once the computing system establishes a mapping between the at least one physical property identifying the physical location and the at least one logical property identifying the logical server name, e.g., by running the method steps depicted in FIG. 4, the computing system can reuse the mapping without performing the discovery of the physical location again. In other words, once the computing system runs the method steps in FIG. 4, the computing system reuses the mapping established through the method steps. For example, a server exterior can have unique visual features such as scratches or MAC address bar codes printed. Therefore, a mapping between such exterior features to the MAC address established earlier can be reused later to map the physical server location (identified by the scratches) to the MAC address and thus IP address and domain names even if an owner of the physical server device changes and it is not possible for the team 225 to login to the physical server device anymore.

FIG. 5 illustrates an exemplary hardware configuration of a computing system 500 running and/or implementing the method steps in FIG. 4. The hardware configuration preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting the system 500 to a data processing network, the Internet, an Intranet, a local area network (LAN), etc., and a display adapter 536 for connecting the bus 512 to a display device 538 and/or printer 539 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for discovering a physical location of a physical server device in a datacenter, the method comprising:
    detecting at least one external physical characteristic of the physical server device pertaining to the physical location of the physical server device;
    acquiring at least one logical property of the physical server device pertaining to a logical server name of the physical server device; and
    correlating the at least one external physical characteristic and the at least one logical property to match the logical server name to the physical location,
    wherein the at least one external physical characteristic further comprises one or more of: an audio signal from the physical server device, or heat signal from the physical server device, wherein the heat comprises heat signal generated from a device running or operating in the physical server device.

2. The computer-implemented method according to claim 1, wherein the at least one external physical characteristic further comprises one or more of: the physical server device's exterior details, a visual signal from the physical server device, an electromagnetic signal from the physical server device.

3. The computer-implemented method according to claim 2, wherein the visual signal comprises one or more of: a first activated indicator device attached on a storage device of the physical server device, a second activated indicator device attached on a network card of the physical server device.

4. The computer-implemented method according to claim 2, wherein the audio signal comprises noise generated from a cooling fan in the physical server device.

5. The computer-implemented method according to claim 2, wherein the at least one external physical characteristic is detected by at least one detector including one or more of: a bar code scanner, a photo or video camera, a microphone.

6. The computer-implemented method according to claim 5, wherein a location of the at least one detector is determined by one or more of: a fixed internal coordinate of the datacenter and a positioning device.

7. The computer-implemented method according to claim 1, wherein the at least one logical property further includes one or more of: a MAC (Media Control Access) address of the physical server device, a unique serial number of the physical server device, a state of an LED attached on a component in the physical server device, a CPU utilization, a network card and hard disk drive states of the physical server device.

8. The computer-implemented method according to claim 1, the at least one logical property is acquired by one or more of: querying to the physical server device, parsing a log file and generating a signal to identify the physical server device.

9. The computer-implemented method according to claim 8, wherein the generating the signal does not require obtaining credentials on the physical server device or does not require running a command or program on the physical server device.

10. The computer-implemented method according to claim 1, wherein the correlation includes a mapping the at least one external physical characteristic to the at least one logical property by using Earth Mover's Distance (EMD) algorithm.

11. The computer-implemented method according to claim 10, further comprising:
    reusing the mapping, without performing the correlation again, to discover the physical location of the physical server device when an owner of the physical server device is changed or a user cannot login to the physical server anymore.

12. A non-transitory computer readable medium embodying computer program instructions being run by a processor for causing a computer to perform method steps for discovering a physical location of a physical server device in a datacenter, said method steps comprising the steps of claim 1.

13. A computer-implemented system for discovering a physical location of a physical server device in a datacenter, the system comprising:

a memory device; and a processor unit in communication with the memory device, the processor unit performs steps of:

detecting at least one external physical characteristic of the physical server device pertaining to the physical location of the physical server device;

acquiring at least one logical property of the physical server device pertaining to a logical server name of the physical server device; and correlating the at least one external physical characteristic and the at least one logical property to match the logical server name to the physical location, wherein the at least one external physical characteristic further comprises one or more of: an audio signal from the physical server device, or heat signal from the physical server device, wherein the heat signal comprises heat generated from a device running or operating in the physical server device.

14. The computer-implemented system according to claim 13, wherein the at least one external physical characteristic further comprises one or more of: the physical server device's exterior details, a visual signal from the physical server device, an electromagnetic signal from the physical server device.

15. The computer-implemented system according to claim 14, wherein the visual signal comprises one or more of: a first activated indicator device attached on a storage device of the physical server device, a second activated indicator device attached on a network card of the physical server device.

16. The computer-implemented system according to claim 14, wherein the audio signal comprises noise generated from a cooling fan in the physical server device.

17. The computer-implemented system according to claim 14, wherein the at least one external physical characteristic is detected by at least one detector including one or more of: a bar code scanner, a photo or video camera, a microphone.

18. The computer-implemented system according to claim 17, wherein a location of the at least one detector is determined by one or more of: a fixed internal coordinate of the datacenter and a positioning device.

19. The computer-implemented system according to claim 13, wherein the at least one logical property further includes one or more of: a MAC (Media Control Access) address of the physical server device, a unique serial number of the physical server device, a state of an LED attached on a component in the physical server device, a CPU utilization, a network card and hard disk drive states of the physical server device.

20. The computer-implemented system according to claim 13, the at least one logical property is acquired by one or more of: querying to the physical server device, parsing a log file and generating a signal to identify the physical server device.

21. The computer-implemented system according to claim 20, wherein the generating the signal does not require obtaining credentials on the physical server device or does not require running a command or program on the physical server device.

22. The computer-implemented system according to claim 13, wherein the correlation includes a mapping the at least one external physical characteristic to the at least one logical property by using Earth Mover's Distance (EMD) algorithm, wherein the processor further performs:

reusing the mapping, without performing the correlation again, to discover the physical location of the physical server device when an owner of the physical server device is changed or a user cannot login to the physical server anymore.

23. A computer program product including a program of instructions in a non-transitory computer readable medium for discovering a physical location of a physical server device in a datacenter, wherein, when the program of instructions are run by at least one processor, the computer program product performs the steps of:

detecting at least one external physical characteristic of the physical server device pertaining to the physical location of the physical server device;

acquiring at least one logical property of the physical server device pertaining to a logical server name of the physical server device; and correlating the at least one external physical characteristic and the at least one logical property to match the logical server name to the physical location, wherein the at least one external physical characteristic further comprises one or more of: an audio signal from the physical server device, or signal heat from the physical server device, wherein the heat signal comprises heat generated from a device running or operating in the physical server device.

* * * * *